United States Patent [19]

Ertemalp

[11] Patent Number: 5,745,110
[45] Date of Patent: Apr. 28, 1998

[54] METHOD AND APPARATUS FOR ARRANGING AND DISPLAYING TASK SCHEDULE INFORMATION IN A CALENDAR VIEW FORMAT

[75] Inventor: Tuna Ertemalp, Redmond, Wash.

[73] Assignee: Microsoft Corporation, Redmond, Wash.

[21] Appl. No.: 947,045

[22] Filed: Oct. 8, 1997

Related U.S. Application Data

[63] Continuation of Ser. No. 401,858, Mar. 10, 1995, abandoned.

[51] Int. Cl.$^6$ ............................................. G06F 15/00
[52] U.S. Cl. .................... 345/340; 345/140; 345/440; 345/508; 345/521
[58] Field of Search ..................... 345/140, 440, 345/326, 340, 508, 511, 521, 35

[56] References Cited

U.S. PATENT DOCUMENTS

| | | | |
|---|---|---|---|
| 3,862,615 | 1/1975 | Liou | 116/135 |
| 4,674,043 | 6/1987 | Hernandez et al. | 395/140 |
| 5,208,906 | 5/1993 | Morgan | 395/148 |
| 5,208,908 | 5/1993 | Harrison et al. | 395/150 |
| 5,313,571 | 5/1994 | Hirose et al. | 395/140 |
| 5,386,581 | 1/1995 | Suzuki et al. | 395/800 |
| 5,450,538 | 9/1995 | Glasser et al. | 395/149 |
| 5,461,708 | 10/1995 | Kaha | 395/140 |
| 5,485,600 | 1/1996 | Joseph et al. | 395/500 |
| 5,493,639 | 2/1996 | Hirano et al. | 395/141 |
| 5,544,288 | 8/1996 | Morgan et al. | 395/157 |

OTHER PUBLICATIONS

*Microsoft Project User's Reference*, "Calendars, pp. 15–30; Custom Field," pp. 82–87; Filters, pp. 131–157; Format Commands, pp. 160–164; Moving Information, pp. 267–272; PERT Chart, pp. 326–329; Reports, pp. 385–388; View Commands, pp. 638–662; 1992 Microsoft Corporation.

*Microsoft Project User's Guide*, "Welcome to Microsoft Project, " ix–xx; Chapter 1 Up and Running—A Quick Tutorial, pp. 3–23; Chapter 2, Managing Your Project with Microsoft Project, pp. 31–34; Printing a Custom Calendar Schedule (Calendar view), pp. 121–122; Printing a Custom Network Diagram to Show Task relationships (PERT Chart), p. 123; Chapter 9, Working with Views, pp. 139–148; Appendix A, What's New About Microsoft Project Version 4.0, pp. 241–249, 1994 Microsoft Corporation.

Lowery, *Managing Projects with Microsoft Project 4.0 for Windows™ and Macintosh™*, Chapter 2, "About Microsoft Project," pp. 11–52; Chapter 8, Evaluating the Schedule, pp. 139–164; Chapter 10, Communicating the Plan, pp. 195–231; Chapter 16, Using Microsoft Project Tools, pp. 335–378; 1994 Van Nostrand Reinhold.

*Microsoft Project Feature Guide*, pp. 1–137, 1992 Microsoft Corporation.

(List continued on next page.)

*Primary Examiner*—Raymond J. Bayerl
*Assistant Examiner*—Ba Huynh
*Attorney, Agent, or Firm*—Klarquist Sparkman Campbell Leigh & Whinston

[57] ABSTRACT

Method and apparatus for quickly arranging task schedule information in a calendar view format using internal caches and configurable, moveable task bars. The internal caches dramatically improve display, layout and access time to task information. The configurable, moveable task bars are displayed left-to-right across dayboxes in the calendar view format. A user can change and configure task schedule information displayed in a task bar, as well as change task bar display attributes. The configurable task bars can also be moved from one daybox to another by the user. When a task bar is configured or moved by a user, the task bar as well as remaining task bars are automatically re-scaled to fit within the vertical space of a daybox.

22 Claims, 8 Drawing Sheets

OTHER PUBLICATIONS

*Law Office Computing*, "Abacus Law+: A User–Defined Upgrade," 2 pages, vol. 4, No. 6, Dec./Jan. 1995.

Abacus Law, copies of screens of program, five pages. Undated, but prior to filing of applicant's patent application.

"New Abacus Law+ Options," 2 pages. Undated, but prior to filing of applicant's patent application.

"Abacus Data Systems, Inc., 2 Weeks: Jan. 6, 2020 to Jan. 17, 2020—Master Calendar," 2 pages. Undated, but prior to filing of applicant's patent application.

"Simplify your practice," Abacus Data Systems supplement to National Law Journal, Los Angeles Daily Journal, Chicago daily Law Bulletin, Indiana Lawyer, New York Law Journal, 6 pages. Undated, but prior to filing of applicant's patent application.

FIG. 3

FONT HEIGHT CACHE

| TASK TYPE | FONT HEIGHT |
|---|---|
| REGULAR | 8 PIXELS |
| CRITICAL | 8 PIXELS |
| MARKED | 8 PIXELS |
| SUMMARY | 8 PIXELS |
| PROJECT | 8 PIXELS |
| HIGHLIGHTED | 18 PIXELS |
| ... | ... |

FIG. 4

TASK ATTRIBUTE CACHE

| TASK ID | VISIBLE TASK | TASK TYPE | START TIME | END TIME |
|---|---|---|---|---|
| 1 | y | Regular | 8:00/M | 5:00/M |
| 2 | y | Regular | 1:00/T | 5:00/W |
| 3 | y | Regular | 8:00/T | 5:00/T |
| 4 | y | Regular | 8:00/M | 5:00/W |
| 5 | y | Regular | 8:00/TH | 5:00/TH |
| 6 | y | Priority | 8:00/F | 5:00/F |
| ... | ... | ... | ... | ... |

FIG. 5

TASK DISPLAY CACHE  80

| DATE | TASKS DISPLAYED | | |
|---|---|---|---|
| MON/2 | 1 | 4 | |
| TUE/3 | 2 | 3 | 4 |
| WED/4 | 2 | 4 | |
| THURS/5 | 5 | 7 | |
| FRI/6 | 6 | 7 | |

| TASK ID | VERTICLE START POSITION |
| --- | --- |
| | TASK BAR BOX HEIGHT |

TASK LAYOUT CACHE — 81

| | |
|---|---|
| 81a | TASK 1 |
| 81b | TASK 2 |
| 81c | TASK 3 |
| 81d | TASK 4 |

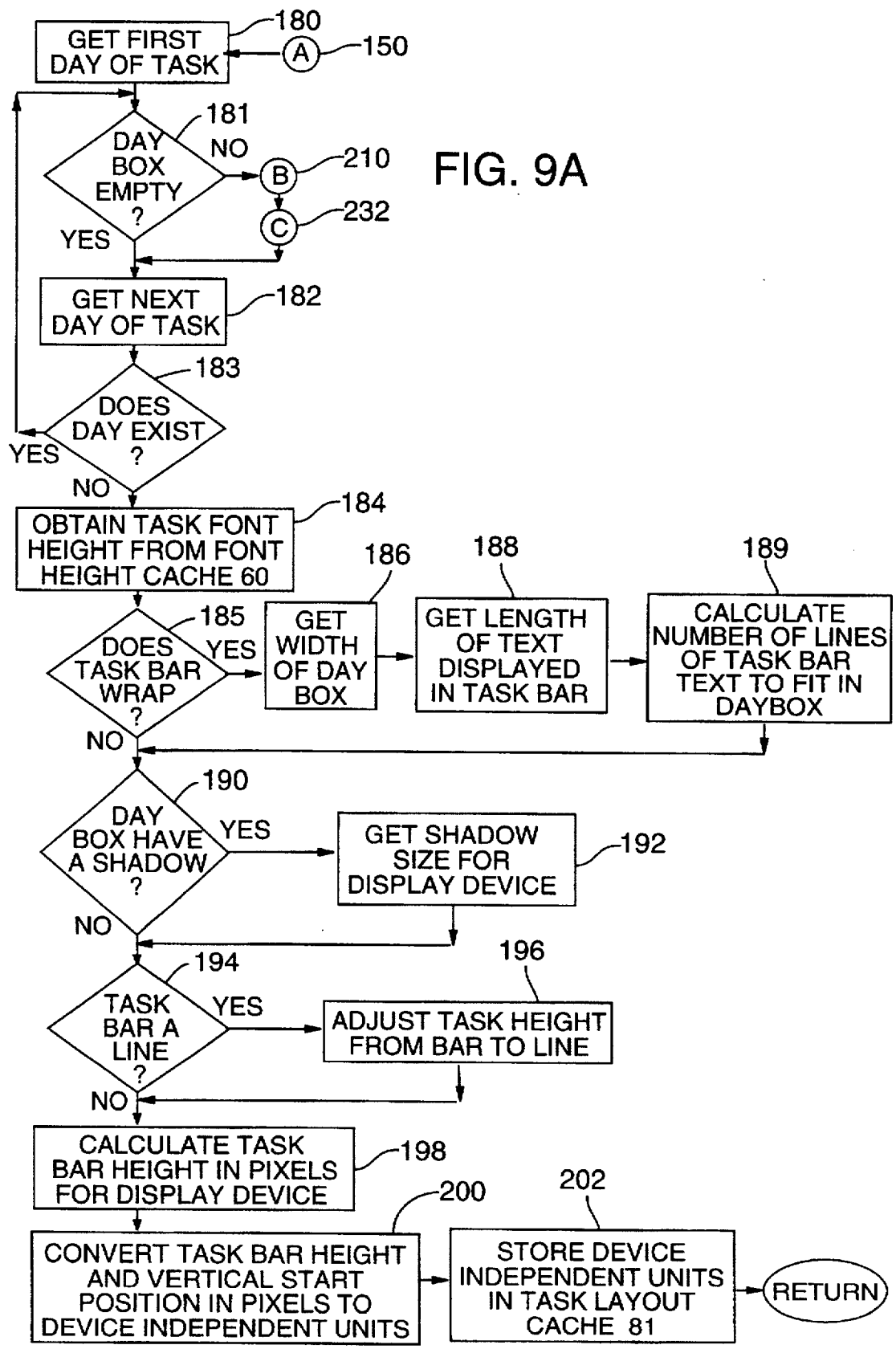

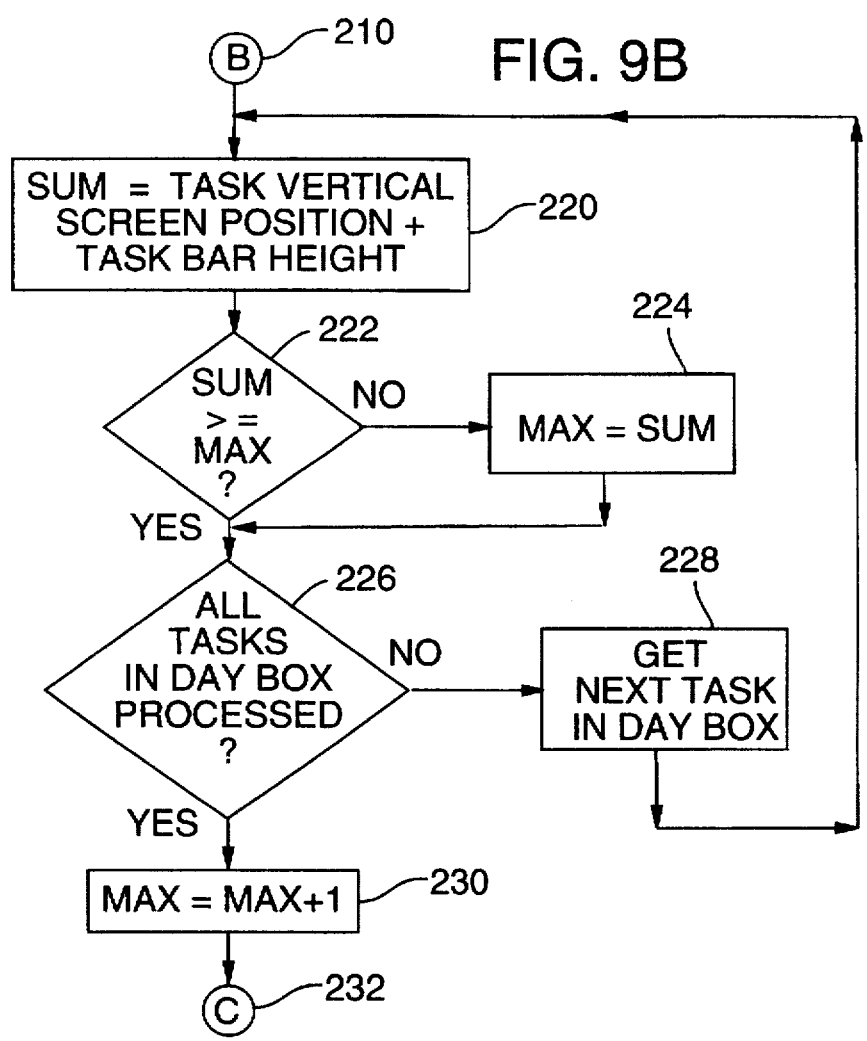

FIG. 10

| ID | TASK NAME | MARKED | START | 25, '94 W\|T\|F\|S | JAN 1, '95 S\|M\|T\|W\|T\|F\|S | JAN 8, '95 S\|M\|T\|W\|T\|F\|S |
|----|-----------|--------|-------|------|------|------|
| 1 | TASK1 | N | 1/2/95 8:00 A | | ■ | |
| 2 | TASK2 | N | 1/3/95 1:00 P | | ■ | |
| 3 | TASK3 | N | 1/3/95 8:00 A | | ■ | |
| 4 | TASK4 | N | 1/2/95 8:00 A | | ■ | |
| 5 | TASK5 | N | 1/5/95 8:00 A | | ■ | |
| 6 | TASK6 | YES | 1/6/95 8:00 A | | ■ | |
| 8 | TASK7 | N | 1/5/95 8:00 A | | ■ | ■ |
| 7 | TASK8 | N | 1/9/95 1:00 P | | | ■ |
| 9 | TASK9 | N | 1/9/95 8:00 A | | | ■ |

FIG. 11

| SUNDAY | MONDAY | TUESDAY | WEDNESDAY | THURSDAY | FRIDAY | SATURDAY |
|---|---|---|---|---|---|---|
| 1 | 2 TASK1, 1D | 3 TASK3, 1D / TASK4, 3D | 4 TASK2, 1.5D | 5 TASK5, 1D | 6 TASK6 (250) | 7 |
| 8 | 9 | 10 | 11 | 12 | 13 TASK7, 3.5D | 14 |
| 15 TASK7, 3.5 D / TASK9 / TASK8 | 16 | 17 | 18 | 19 | 20 | 21 |
| 22 | 23 | 24 | 25 | 26 | 27 | 28 |

METHOD AND APPARATUS FOR ARRANGING AND DISPLAYING TASK SCHEDULE INFORMATION IN A CALENDAR VIEW FORMAT

This application is a continuation of application Ser. No. 08/401,858, filed on Mar. 10, 1995, now abandoned.

FIELD OF THE INVENTION

This invention relates generally to computer software applications such as project management applications that schedule and display a number of tasks defined by the user. More particularly, this invention relates to a method and apparatus for arranging taskbars to facilitate quick display and manipulation of task information in a calendar view format.

BACKGROUND AND SUMMARY OF THE INVENTION

A common use of a computer application program is to manage tasks that are to be completed for a desired project. This type of application is commonly called a project management application, an example of which is Microsoft Project 3.0, available from Microsoft Corporation of Redmond, Wash. A user will typically want to define, plan, and schedule tasks that must be completed to achieve a goal. A project management application program helps the user define project goals, plan tasks and resources, display a project plan, carry out and manage the project. There are many benefits to using a project management application program. These include (1) automatically calculating the project schedule; (2) automatically updating the project schedule if task information is changed; (3) easily analyzing the project schedule; to schedule resources and evaluate alternatives; (4) providing schedule output in a standard format which is consistent for all projects; and (5) storing the schedule data for use in future projects. This list is just some examples of the many advantages of a project management application program.

A project management schedule is composed of tasks. The schedule defines the sequence in which the tasks must occur, the resources needed to complete a task, and calendar information about the tasks such as days and times. Each task is defined to include such information as its start and finish day and time, the percent of work complete, the resources it uses, and the actual cost, etc.

Project schedules containing task information are typically displayed by three methods in the prior art. These three methods are Tables, Gantt Charts, and PERT Charts.

A Table display consists of a group of rows and columns. The rows usually designate a specific task and the columns designate the information to be displayed for each task (e.g. task duration, start time and date, finish time and date, cost, etc.).

The Gantt Chart is named after Henry L. Gantt who first used a bar chart during World War I to graphically plot tasks on a timescale to indicate the start and finish dates of a task. A Gantt Chart typically shows a list of tasks on the left side of a display, and a bar chart on the right side of the display. The bar chart graphically shows the task information on a timescale defined by the user. The Gantt chart display is preferred over the Table display since the task information is displayed graphically and can be followed over the timescale in an easier manner to examine and compare task information compared.

The PERT (Program, Evaluation, Review, Technique) Chart was developed by the Lockheed Company during the 1950's to create schedules for the Polaris Missile Project. The original PERT Chart used by Lockheed used statistical probabilities to calculate expected project durations. Today, a PERT Chart is typically used to show the dependencies between tasks in a task schedule. PERT Chart allows a user to create and display relationships between tasks based on these dependencies.

In the prior art, project management applications allow a user to display task information in the Table, Gantt and PERT Chart formats. However, each of these formats has its own disadvantages. The Table display is usually too complex in the row and column format to be used to effectively manage and view task schedule information. Existing Gantt charts have disadvantages that limit their effectiveness to display task schedule information. For example, one disadvantage of the Gantt chart is the task information is displayed from top-to-bottom on the timescale. Each Gantt bar is typically on a separate line on the display, so the user is only able to see those tasks which fit on the display. If there are hundreds of tasks in a schedule, only a small portion of that number would be displayed on the timescale. The PERT chart becomes large and unmanageable very quickly as the number of tasks increase and, like the Gantt chart, can only display a small portion of the task schedule. The PERT chart dependency information may be so complex that it cannot be easily understood by a user.

There are other disadvantages in the way Tables, Gantt charts and PERT charts are used to display task schedule information. One disadvantage is the user typically cannot sort or filter the task information. All tasks are displayed in the order defined by the project management application. Another disadvantage is the task display information is not configurable by the user. For example, the user usually cannot change the font size or display attributes of a task schedule display, which may be desirable to draw attention to a critical task. A third disadvantage is that the task information is not displayed to make maximum use of the display space on the display device. Current display techniques tend to leave a large amount of wasted "white space" on the screen that could be used to display task information, which makes the task schedule harder to examine. A fourth disadvantage is the user cannot dynamically move a task bar to another part of the screen. This would be desirable for comparing two tasks, one on top of the other.

Several project management applications such as Abacus Law, by Abacus Data Systems, Inc. of San Diego, Calif., and Microsoft Project 4.0, by the Microsoft Corporation of Redmond, Wash. also have the ability to display task schedule information in another format known as a calendar view format. The calendar view format displays days of the month as dayboxes, as they would appear on a calendar. Tasks are displayed as task bars that span the dayboxes left-to-right on days which the tasks were scheduled. However, these applications are typically very slow when laying out task information in the calendar view format, especially when the number of tasks to be laid out is large. The display characteristics and location of the task bars are not configurable by a user, and the applications typically do not make optimal use of the vertical display space in a daybox.

An object of the invention, therefore, is to quickly arrange task schedule information in a calendar view format. Another object of the invention is to arrange task schedule information as configurable, moveable task bars.

In accordance with the invention, method and apparatus for displaying a task bar in a task management device is shown and described. In a preferred embodiment, the task bar is displayed in the context of a calendar view format of the task management device. The method includes providing a cache in memory for storing information about a task bar. To display a task bar, the cache is accessed and the task bar information is obtained. The task bar is then displayed based on the task information from the cache.

In one aspect of the invention, the task management device may include several internal caches that store different types of information about task bars. One cache may store information about font height of text within a task bar. A second cache may store information about attributes of the task bar. A third cache may store information about how task bars are ordered relative to each other. A fourth cache may store information about position and height of the task bar. The internal caches improve the access time to task information from cubic time to near linear time.

In another aspect of the invention, task bars constructed displayed in the calendar view format are configurable by the user and may be moved by the user from one daybox to another. When a task bar is reconfigured or moved, other task bars in the same daybox are quickly and automatically re-sized and positioned to fit within the vertical space of the daybox. This re-sizing and positioning may be based on information within the cache about existing task bars. The order of task bar display, or whether tasks displayed within a task bar are filtered, may also be based on information within the cache.

The foregoing and additional features and advantages of the present invention will be more readily apparent from the following detailed description thereof, which proceeds with reference to the accompanying drawings.

BRIEF DESCRIPTION OF THE DRAWINGS

FIG. 3 is a block diagram of the font height cache shown in FIG. 2.

FIG. 4 is a block diagram of the task attribute cache shown in FIG. 2.

FIG. 5 is a block diagram of the task display cache shown in FIG. 2.

FIG. 6A is a block diagram showing the fields of the structure used to store information in the task layout cache shown in FIG. 6B.

FIG. 6B is a block diagram of the task layout cache shown in FIG. 2.

FIGS. 9A, 9B are flow charts showing how the width and height of a task bar drawn in a day box are calculated.

FIG. 10 shows a Table and Gantt chart display of task information.

FIG. 11 shows a calendar view display of task schedule information with configurable task bars using the same task schedule information displayed in the Table and Gantt chart shown in FIG. 10.

DESCRIPTION OF A PREFERRED EMBODIMENT

Figure 1:
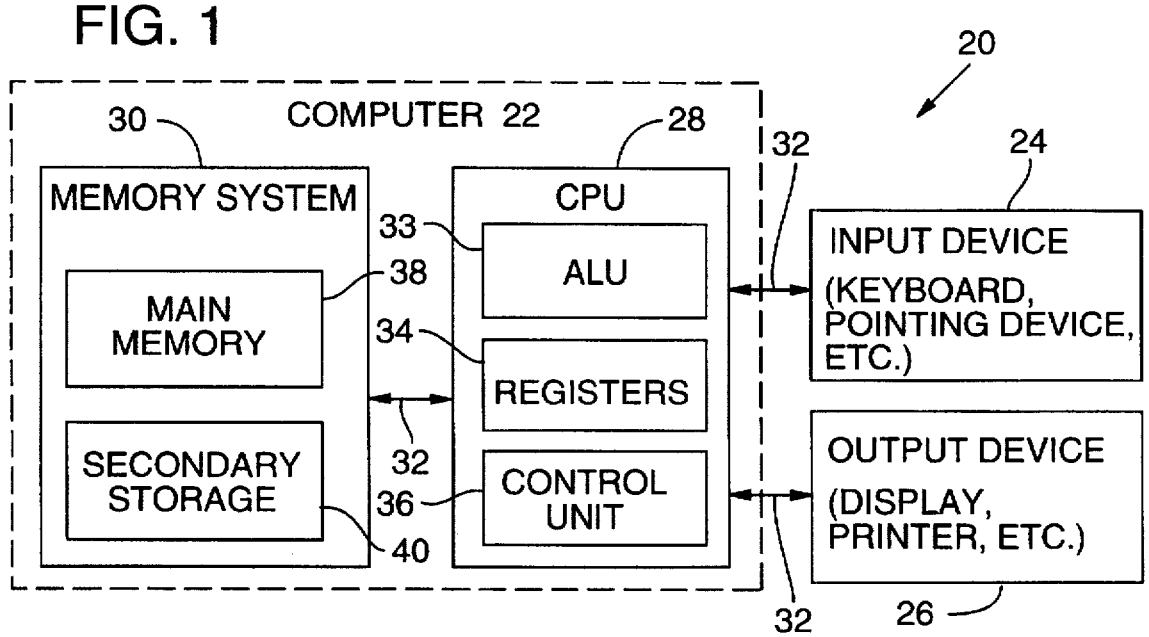
FIG. 1 is a block diagram of a computer system that may be used to implement method and apparatus embodying the invention.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of the computer system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device, or other device for providing output data from the computer 22.

It should be understood that FIG. 1 is a block diagram illustrating the basic elements of a computer system; the figure is not intended to illustrate a specific architecture for a computer system 20. For example, no particular bus structure is shown because various bus structures may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e. multiple CPUs, client-server systems, computer networking, etc.).

Figure 2:
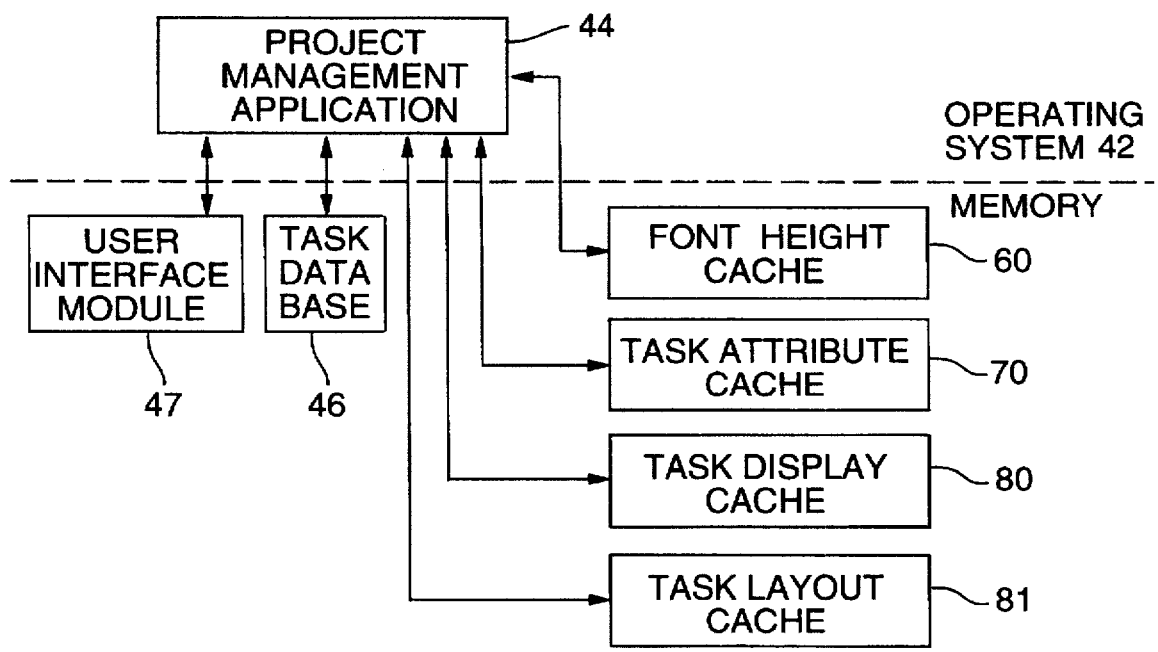
FIG. 2 is a block diagram of a project management application program, operating system, task information source including a task data base and user interface module, and four internal caches, used within a computer system such as shown in FIG. 1.

FIG. 2 is a block diagram of a project management application program 44, an operating system 42, a task information source including a task data base 46, and a user interface module 47 all stored within a memory system of a computer system 20 such as that shown in FIG. 1. Project management application (PMA) 44 obtains task information and task display information by making a function call to the task data base 46 and to the user interface module 47, respectively. PMA 44 passes, as a parameter to the task data base 46 or user interface module 47, a pointer to a structure which contains fields to be filled with data from the task data base 46, or the user interface module 47. The fields of the structure receive information from the data base about the task (e.g. start time, finish time, etc.), and information from the user interface module for displaying the task bar on display device 26 (e.g. color, font size, etc.).

To create a calendar view display with configurable task bars, PMA 44 calls the task data base 46 to obtain task information about each task PMA will display as a configurable task bar. In the process, four caches are created to store the task information and thereby allow quick look-up and display of task information. These four caches are called the font height cache, the task attribute cache, the task display cache, and the task layout cache.

The Internal Cache System

As FIG. 2 illustrates, PMA 44 creates a first cache 60 that stores the height of each font used to display text in the configurable task bars. As will be described, PMA 44 makes calls to the user interface module 47 to obtain font information about specific tasks. PMA 44 stores pieces of this task information in an internal cache, stored within main memory 38, called the font height cache 60. The memory used to store this cache is typically high speed random access memory, but other types of memory or secondary storage 40 such as a hard disk could also be used.

FIG. 3 is a block diagram of the font height cache 60. Cache 60 is built as the PMA 44 reads task display information from the user interface module 47. The contents of this cache 60 change as a user changes the font attributes of a task bar. The PMA 44, based on user input, calls the interface module 47 to assign different fonts and font attributes to different task types. A task type 60a is used as an index to store the task type font height 60b. For example, FIG. 3 shows task type "regular" has a font height of 8 pixels, while task type "highlighted" has a font height of 18 pixels. The font height cache 60 enables the PMA 44 to quickly obtain the font height of text in each configurable task bar to calculate the actual display height of the task bar. PMA 44 is not required to make additional, time consuming calls to the operating system 42 or the user interface module 47 to obtain this font height information once it has been entered in cache 60. As will be described below, PMA 44 uses the font size stored in the font height cache 60 to calculate the task bar height, when the task bar is laid out on the calendar view.

The PMA 44 also creates a second cache 70 that stores common attribute information for layout of the configurable task bars. As FIG. 2 illustrates, PMA 44 makes calls to the task data base 46 to obtain attribute information about tasks,and stores this task information into internal cache 70 in main memory 38. This cache is called the task attribute cache 70. The memory used to store this cache is typically high speed random access memory, but other types of memory or secondary storage such as a hard disk could also be used. The task attribute cache 70 is indexed by a task identifier 70a. Each entry in the task attribute cache 70 stores task attribute information as a structure consisting of a number of information fields 70b–70e.

FIG. 4 is a block diagram of cache 70. The task attribute cache 70 stores attribute information such as whether the task is visible (70b) on the display device, thus requiring a task to be drawn, the type of task (70c) (e.g. regular, priority, etc.) to determine default and other display attributes, start time (70d), and end time (70e). For example, FIG. 4 shows that Task 1 is visible, is a regular task, has a start time of 8:00 on Monday, and a finish time of 5:00 on Monday. Task 6 is visible, is a priority task, has a start time of 8:00 on Friday and a finish time of 5:00 on Friday.

The task attribute cache 70, once it is built, allows rapid lookup of task information for arranging configurable task bars on a calendar view display. Experience indicates that lookup through the cache 70 is almost linearly proportional to the number of tasks looked up. This contrasts with the lookup time that is $n^3$, where n is the number of tasks that is required if the PMA 44 must make calls to the task data base 46 each time information is needed about a task bar that is laid out in the calendar format. The result of using this cache is thus a significant time savings in arranging the associated task bars.

PMA 44 also creates a third internal cache 80 called the task display cache to store a list of configurable tasks that will be displayed in each daybox of the calendar view. FIG. 2 shows how the PMA 44 makes calls to the task data base 46 to obtain task information about tasks, and how pieces of the task information are built into the task display cache 80 stored in memory 38. The memory used to store this cache is typically high speed random access memory, but other types of memory or secondary storage 40 such as a hard disk could also be used.

FIG. 5 shows a block diagram of a default task display cache 80 layout. The task display cache 80 is indexed by date (80a), and task display information (80b) is stored in a default order determined by the PMA 44 or by a sorted and filtered order chosen by the user. PMA 44 ultimately creates a fourth internal cache 81 called the task layout cache to store the position and height of all configurable tasks that will be displayed in the calendar view. This cache is stored in memory 38. The memory used to store this cache is typically high speed random access memory, but other types of memory or secondary storage 40 such as a hard disk could also be used. The flow chart in FIG. 9A shows how the pieces of the task layout cache 81 are built and stored in memory 38. A block diagram showing the task layout structure 90 used to store task information in the task layout cache 81 is shown in FIG. 6A. The structure contains fields which hold the task identifier 90a, the vertical starting position 90b of the task bar for the daybox in device-independent units, and the task bar height 90c in device-independent units. Each of the task entries 1–4 in FIG. 6B, are stored using the structure 90 of FIG. 6A. An explanation of the structure fields for storing the vertical starting position 90b and the task bar height 90c is given below. The place of each task in the dayboxes it spans on the calendar view is calculated by the PMA 44, and this information is stored in the task layout cache 81. The position is calculated only once, checking for conflicts in all of the spanned dayboxes. To do this, the time period that the task spans is examined, and the task position relative to one or more other tasks previously assigned a place in the spanned daybox is calculated. Therefore, to calculate the position of a task in spanned dayboxes requires only an awareness of previously assigned tasks in the spanned dayboxes, instead of all tasks in every daybox in the calendar view.

This results in a significant time savings over previous implementations since each task is positioned only once in all dayboxes which it may span. If each daybox was examined to position tasks, many of the task's positions would be reprocessed several times.

To illustrate this concept, FIG. 5 shows the layout of the tasks after Tasks 1–7 have been positioned. Task 1 is a one day task for Monday the 2nd. Task 2 spans two days, Tuesday and Wednesday. Task 4 spans three days, Monday-–Wednesday 80b–80d. When Task 4 is positioned, it is positioned once in the proper place for the dayboxes of Monday, Tuesday, and Wednesday, at the same time.

As shown in FIG. 5, the position of Task 4 is determined relative to tasks already positioned in the dayboxes. Since Task 4 spans three days, and there are already two other tasks (2 & 3) displayed on Tuesday, Task 4 is positioned below the second task (Task 3) on Tuesday. However, there is only one other task displayed on Monday (Task 1), and Wednesday (Task 2). A space must therefore be left on the calendar view between Task 1 on Monday, and Task 2 on Wednesday to allow Task 4 to span all three days without overlapping Task 3. This space is not stored separately in the task display cache 80 as it would waste memory. Cache 80 and cache structure 90 together provide for the task spacing in the calendar view display of FIG. 11.

The potential for task overlap is illustrated by examining the dayboxes for Monday–Wednesday on the calendar view of these tasks shown in FIG. 11. When Task 4 is displayed, spaces are added in the dayboxes for Monday and Wednesday, and Task 4 is placed below Task 3 in the daybox for Tuesday, successfully spanning three days without overlapping any existing tasks in the three dayboxes.

In the preferred embodiment of the invention, a user may sort and filter task information that is displayed in the day box. A user of the PMA 44 can change the default "sort" order which is ascending numerical order (smallest to largest) to descending numerical order (largest to smallest), or others such as priority order, etc. A user of the PMA 44 can also "filter" out tasks that the user does not want to see in a particular day box.

For example, suppose a daybox contained Tasks 6, 7, 10, 11, and 12. If Task 6 and Task 7 are crucial to the project, a user may decide not to display tasks 10–12, to bring attention to critical Tasks 6 and 7. Thus Task 10–12 are filtered out and not shown in the daybox on the calendar view display.

If a user has created a sorted and filtered task list, this list is combined with the default task list in the task display cache 80. This combination provides a list of tasks that fully or partially overlap with the current daybox task's positions in time. If the task to be displayed in a daybox has a duration of one day, the task may be fully overlapped. If the task to be displayed has a duration of more than one day, the task may be partially overlapped as only a portion of the whole configurable task bar will appear in the daybox. For example, if Task 3 started at 8:00 am on Wednesday, and Task 2 started at 1:00 pm on Wednesday, Task 2 would partially overlap Task 3. A full overlap would mean Task 2 and Task 3 started at 8:00 am on Wednesday. See the dayboxes for Tuesday and Wednesday in FIG. 11 for an illustration of this fact.

Figure 7:
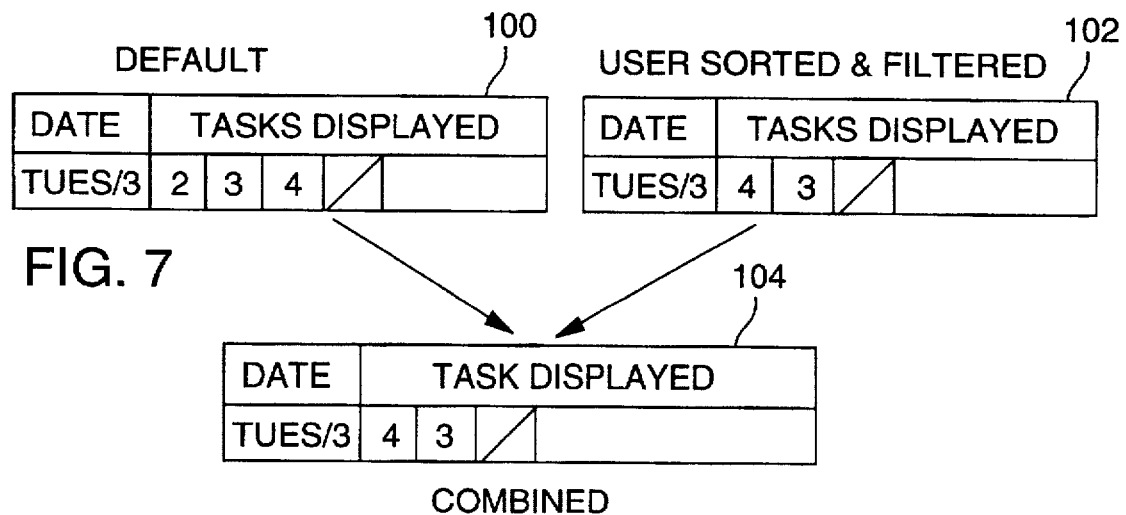
FIG. 7 is a block diagram showing how a default task list and user sorted and filtered task list are combined and stored in the task display cache.

FIG. 7 shows an example of combining a default task list 100 from cache 80 with a user's sorted and filtered list 102 to form a combined task list 104. The user's sorted and filtered list 104, which is sorted in descending numerical order (largest-to-smallest), and has filtered out Task 2, takes priority over the default task list which displays tasks in ascending numerical order (smallest-to-largest) and displays all tasks. The combined task list 104 in the daybox for Tuesday would contain only Task 4 and Task 3 (in that order), since Task 2 was filtered out, and tasks are now sorted reflecting the user's sorted order.

Figure 8:
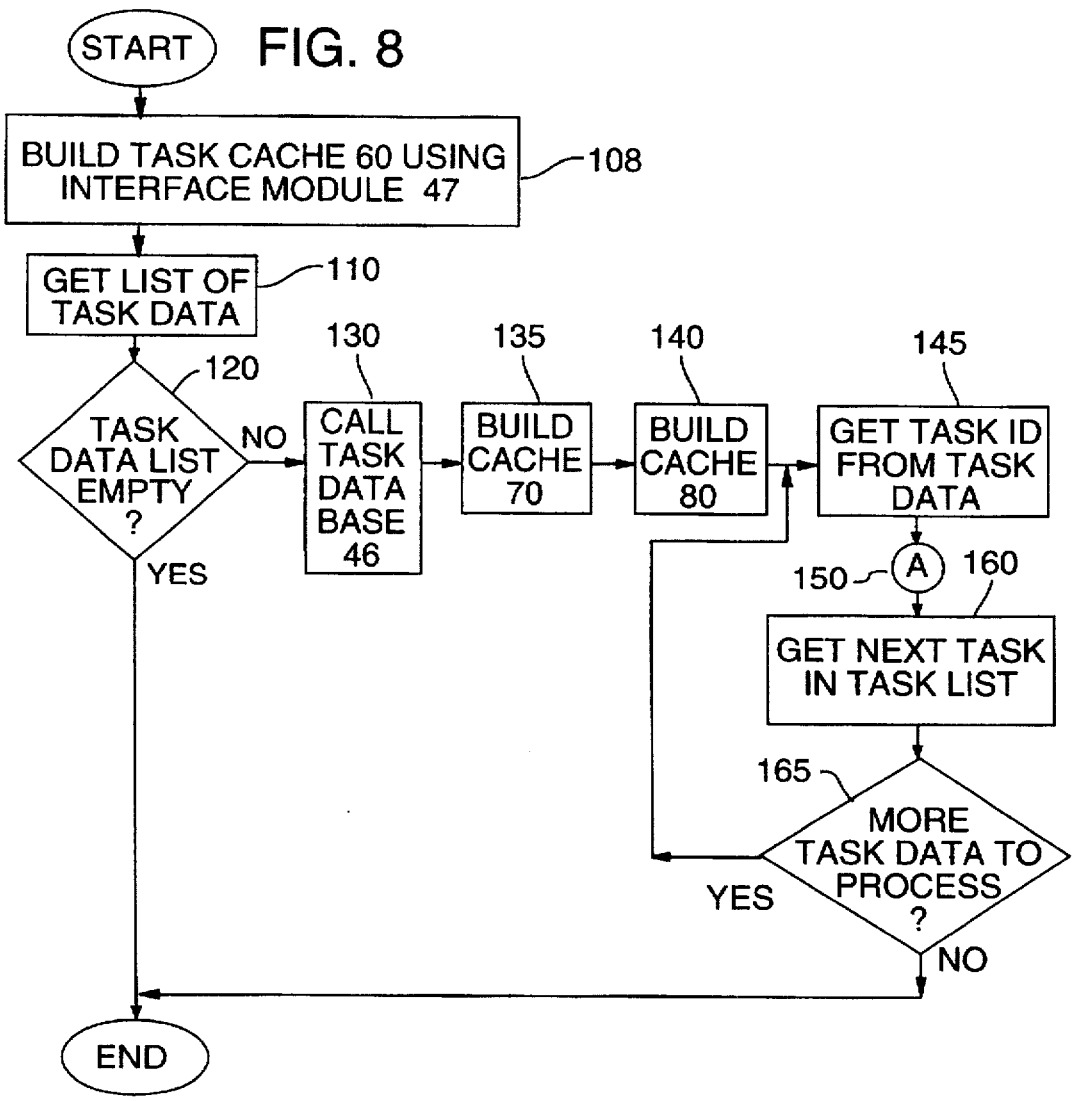
FIG. 8 is a flow chart showing how the internal caches are filled with task information obtained from the task data base.

How a task is actually positioned in a daybox, that is, how task information is stored in the task layout cache 81 is shown by the flowcharts in FIGS. 8, 9A and 9B. The flow chart in FIG. 8 shows how the PMA 44 obtains task information. As a first step 108, PMA 44 first builds cache 60 by calling the user interface module 47. Then PMA gets a list of tasks from the task data base 46 (110). If the task list is not empty (120), then the PMA will call the task data base 46 to get task information for each task in the task list (130). Using this task information the PMA builds the cache 70 (135) and cache 80 (140). PMA then extracts a task identifier from the task information obtained from the task data base 46 (145) and calls a function (150) shown in FIG. 9A to place the task in all of the dayboxes which it spans. Upon return from the function call (150), the next block of task information is obtained by advancing a task information pointer (160). If the task information pointer is not null (165), then the next task id is extracted from the task information (145). This part of the procedure (145–165) is repeated until all tasks in the task information block has been processed.

Referring to FIGS. 9A & 9B the function illustrated by this flow chart positions the task in all dayboxes that it spans. If the task is the first task to be added to the task layout cache 81 for all the dayboxes it spans (180–183), then the height of the task bar that is displayed for the task is immediately calculated. To calculate the height of the task bar, the font height cache 60 is accessed to determine the font height of the text to be displayed in the configurable task bar height (184).

Next, a series of calculations are done. Referring FIG. 9B, the task bar is checked to determine if it wraps around on the display device (185). If so, then the width of each daybox is found (186), and the length of the text to be displayed inside the configurable task bar is found 188, since the text of a configurable task bar is user definable. A calculation is done to determine the number of lines of text in the taskbar which will fit in the daybox. Using these values 184, 186, 188, the total task bar height is calculated 189. Next, it is determined whether the configurable task bar will have a "shadow" when it is displayed 190. If so, the shadow size is found because each shadow takes up vertical space in the daybox 192 which must be compensated for. Then it is determined whether the user prefers the task bar to be displayed as a line instead of a bar 194. If the task bar will be a line, the task bar height is adjusted as required 196.

With the information from steps 184–196, a series of calculations is done to obtain a task bar height in pixels corresponding to the resolution of the display device 198. The calculated result is then converted into a device independent value 200 which is stored along with the vertical start position in the corresponding task layout cache structure 90, in the task layout cache 81 as configurable task bar display height 202. The called function then returns.

The task bar cache information (task bar height and vertical start position) is stored in a device-independent format as Calunits. A Calunit is arbitrarily defined as the pixel height of a 36 pt. system font on the current display device, divided by 36 and rounded up to the nearest integer, with a minimum of one Calunit. Other Calunits could be similarly defined. All vertical positions and task bar heights are stored as Calunits. During the actual drawing of the calendar view, the Calunits are converted to pixels for the current display device. This makes the calendar view layout permanent across computer systems. If the user saved task information in dayboxes corresponding to a calendar view in a file, and opened the file on another computer system with a different display device at a different display resolution, the same configurable task bar layout would be displayed as was displayed on the original system. The Calunits stored for the task bars vertical display position and task bar height would be automatically converted into the proper number of pixels necessary for the new display device, and provide calendar view output a format virtually identical to that displayed on the original computer system.

Returning to step 181 of FIG. 9A, if there are already tasks stored in the task layout cache 81 for all the dayboxes this task is spanning, then further processing 210 is required before proceeding. Turning to FIG. 9B, step 220 adds each task's starting vertical display position to its task bar height.

The sum is then used to consider only those tasks in the daybox that would overlap the task we are currently trying to find a spot for. Any task starting after or finishing before the processed task are not considered. This guarantees that the vertical space in each daybox will be used as much as possible, and tasks will "bubble up" to fill in the gaps between other partial-day tasks. The sum obtained (220) is compared (222) to a maximum value which is used to find the task position in all the dayboxes it will span to avoid overlapping with other bars. If the sum is the present maximum value, the maximum value is changed to the sum (224).

The maximum value of adding the vertical display position to the task bar height for all tasks in the daybox is obtained. All the tasks in the daybox are looped through steps 220–228, so this maximum value of all tasks presently in the daybox is obtained. The maximum value is incremented by one (230), and as a result, the position of the task to be placed in the daybox is obtained. The task is placed below (on the vertical) all other existing tasks in the daybox. Returning to FIG. 9A, the height of the task bar for display is now calculated and stored as described with references to steps 184–196. The vertical display position, task bar height pair in Calunits is then stored in the task layout cache 81 for the given daybox 202.

The result is a cache 81 which contains the vertical display position and the task bar display height for each task in any daybox. The task bars have been stored and saved in a fashion that ensures no task bar overlaps any other task bar in a given day box. And the vertical space in each daybox has been optimally used from top to bottom. User's wishes relating to configuring, sorting, filtering, and hiding tasks have been satisfied. This is shown in FIG. 11.

The data in the font height cache 60, task display cache 80 and the task layout cache 81 is stored as the PMA 44 reads task information from the task data base 46. After the four caches 60 70 80 81 have been created, the PMA 44 need not call data base 46 to display a calendar view of task schedule information. The necessary task layout information in the dayboxes is instead taken from the caches and used to create the calendar view display. The task attribute cache 70 is typically destroyed after the other caches 60 80 81 are built and the task layout is complete.

One way to determine the run-time efficiency of an application, as is common in the art, is to measure the execution time of the particular implementation on a specific computer for a selected set of inputs. "Big-oh", or "O(f(n))" notation is commonly used for this purpose in the art. Therefore, the four caches, once they are built, improve the run-time efficiency of task information look-up for calendar view layout from cubic time $O(n^3)$ "big-oh of n cubed" to linear time $O(n)$ "big-oh of n" where "n" is the number of tasks. As can be seen from the discussion above, when the number of tasks "n" gets large, the time savings of using the task information caches 60, 70, 80, and 81 increases dramatically. It has been determined through experimentation that four internal caches appear to provide the optimal time savings for the preferred embodiment of this invention. Using more or fewer caches may actually increase the time it takes to access or display task information.

CONFIGURABLE, MOVEABLE TASK BARS

The task bars in the preferred embodiment are configurable by the user. The user can change the display text, the font size of the display text, the color and pattern of the task bar. Changing the font size allows the user to draw attention to a certain critical task as shown for Task 6 at 250 in FIG. 11. If the font size of a configurable task bar is changed, then the font height cache 80 entry is changed for the particular task bar type by simply replacing the old font height with the new font height in memory.

Changing the font size will cause the configurable task bar in a daybox to take up more space (if the new font size is bigger) or less space (if the new font size was smaller). The position of other task bars to be displayed in the same daybox must be adjusted to ensure all the tasks will fit in the vertical space. Adjustments are made in the task layout cache 81 by re-calculating the vertical position and task box height of each task bar displayed in the daybox using the font height cache 60, task attribute cache 70, and following the steps in FIGS. 9A and 9B. After the values in the task layout cache 81 are adjusted, the daybox will display the task bar whose font size changed and the remaining tasks scaled to fit in the vertical space when the PMA 44 displays the calendar view. The task bar for Task 6 250 of FIG. 11 is an example of a task bar whose font size was increased to draw attention to the task.

Changing other task bar attributes that affect task bar size also requires changing the vertical start position and the task bar height following the steps in FIG. 9A.

The preferred embodiment also allows a user to move a task bar from one daybox to another anywhere on the screen. Using caches 60, 70, 80, 81 the task bar is moved by changing the task bar's vertical position in the task layout cache 81 from the old value to the new value. Since the vertical position and task box height are stored in the task layout cache 81, allowing a user to move a task bar to any daybox is a quick and efficient process.

Displaying Task Bars Using the Cache System

The task bar inside each daybox is drawn from left-to-right during display time. When the PMA 44 is requested to draw the task bars inside a daybox, the task layout cache 81 and the task display cache 80 are used. The PMA 44 finds the tasks to draw in the task display cache 80, looks at the start and finish times of the tasks from the task database 46, gets the task bar vertical display position and task box height from the task layout cache 81, and then scales the width of the task bar by the number of minutes between the start of the workday and the end of it. The task bar is then drawn on the display according to daybox width and task bar height. This achieves the effect of a horizontal timeline within each daybox without having to complete complicated layout calculations for each daybox at display time. This scheme also provides efficiency by not requiring the layout calculations if the user changes the width of the daybox on the display device.

Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. Word lengths and word aligned boundaries may vary, depending upon the hardware of the computer system 20. In view of the many possible embodiments to which the principles of the invention may be applied, it should be recognized that the illustrated embodiment is only a preferred example of the invention and should not be taken as a limitation on the scope of the invention. Rather, the scope of the invention is defined by the following claims. I therefore claim as my invention all that comes within the scope and spirit of these claims.

I claim:

1. A method of creating and displaying a plurality of task bars in a task management device, the plurality of task bars including a representation of task data over an associated time period, the method comprising the following steps:
   providing a task information data base containing task information;
   providing a cache in memory;
   storing task information from the task information data base for a plurality of tasks in the cache;
   creating task bars based on task information in the cache by:
      selecting a time period,
      determining which of the plurality of tasks are associated with the selected time period, and
      rendering a task bar in the cache associated with the selected time period; and
   displaying task bars from the cache on a display device in a time-based format.

2. The method of claim 1 wherein the cache providing step includes providing a font height cache that stores information about font height of text displayed within the task bars, the font height cache storing changes for the font size of text displayed within a task bar associated with a specific time period.

3. The method of claim 1 wherein the rendering step includes using task information from the cache corresponding to how tasks are ordered relative to each other, the ordering including an awareness of only tasks associated with the selected time period and not all tasks.

4. The method of claim 1 wherein the cache contains task information about the font height of text displayed within a task bar, and rendering a task bar include calculating from the font height a display height of the task bar.

5. The method of claim 4 where the rendering includes converting a task bar display height and a task bar display position to device independent values and storing the device independent values in the cache.

6. The method of claim 5 where the device independent values are Calunits comprising values with a pixel height of a 36 point font divided by 36 and rounded up to the nearest integer, with a minimum of one Calunit.

7. The method of claim 1 wherein the cache contains task information about font height of text within a first task bar, and creating a second task bar includes calculating a display height of the second task bar based on the font height of text within the first task bar.

8. The method of claim 1 wherein the cache contains task information about the starting and ending dates of a task bar, and rendering the task bar includes determining these dates for task bar for the selected time period.

9. The method of claim 1 wherein the cache providing step includes:
   providing a first cache that stores information about font height of text within the task bar;
   providing a second cache that stores information about attributes of the task bar, the attributes including shadowing characteristics and wrapping characteristics of a task bar displayed in a horizontal manner;
   providing a third cache that stores information about how the task bars are ordered relative to each other with respect to a selected time period; and
   providing a fourth cache that stores information about the height and display position of the task bar in device independent units for display purposes in a time-base format.

10. The method of claim 1 further comprising:
    displaying tasks bars on the display device in a first ordering;
    accepting user information allowing the task bars displayed in the first ordering to be sorted or filtered;
    creating a second ordering with the accepted user information, the second ordering different from the first ordering; and
    displaying tasks bars on the display device in the second ordering.

11. The method of claim 1 further comprising:
    selecting a time period corresponding to selected days in a selected month;
    determining which of the plurality of tasks are associated with the selected days;
    rendering in the cache without interference in a device independent format, task bars corresponding to the tasks associated with the selected days using the assembled task information; and
    rendering on the display device a plurality of day boxes in a calendar view format, the day boxes corresponding to the days of the selected month; and
    using the rendered task bars in the cache, displaying the task bars associated with the selected days horizontally in the rendered day boxes on the display device in a calendar view format.

12. The method of claim 1 further comprising:
    rendering in the cache without interference in a device independent format, task bars corresponding to the tasks associated with the selected time period using the assembled task information, the rendering including:
       rendering the task bars associated with the selected time period in a horizontal display format,
       eliminating vertical spacing between the rendered horizontal task bars associated with the selected time period thereby using the vertical display space in an optimized manner, and
       converting the format of the task bars into device independent values.

13. An apparatus for displaying a plurality of task bars in a task management device, the plurality of task bars including a representation of data for a task over an associated time period, comprising:
    a task information database, the task information database containing task information;
    a cache in memory;
    means for storing task information from the task information database for a plurality of tasks in the cache;
    means for selecting a time period;
    means for determining which of the plurality of tasks are associated with the selected time period;
    means for rendering in the cache, the task bars corresponding to the tasks associated with the selected time period using the task information; and
    means for displaying the task bars from the cache on a display device in time based format.

14. The apparatus of claim 13 wherein the cache is constructed to store information about the font height of text displayed within the task bar.

15. The apparatus of claim 13 wherein the cache is constructed to store information about how the task bars are ordered relative to each other, the ordering including an awareness of only tasks associated with the selected time period and not all tasks.

16. The apparatus of claim 13 including the following caches:
- a first cache that stores information about font height of text within the task bar;
- a second cache that stores information about attributes of the task bare, the attributes including shadowing characteristics and wrapping characteristics of a task bar displayed in a horizontal manner;
- a third cache that stores information about how the task bars are ordered relative to each other with respect to a selected time period; and
- a fourth cache that stores information about the height and display position of the task bar in device independent units for display purposes in a time-base format.

17. A method of displaying a plurality of task bars in a task management device, the plurality of task bars including a representation of task data over an associated time period, comprising:
- providing at least one cache in memory for storing information about font height of text within the task bars, information about attributes of the task bars, information about how task bars are ordered relative to each other with respect to a selected time period, and information about task bar height and display position in a device independent format for display in a time-based format;
- accessing the cache to store and obtain the task bar information, the storing including rendering in the cache, task bars corresponding to each of the tasks associated with a selected time period; and
- displaying the task bars based on the task information rendered in the cache in a time-based format.

18. The method of claim 17 wherein rendering the task bars includes using task information from the cache corresponding to how tasks are ordered relative to each other, the ordering including an awareness of only tasks associated with the selected time period and not all tasks.

19. The method of claim 17 wherein displaying the task bars includes selectively hiding or displaying the task bars using filter information stored in the cache associated with a selected time period input by a user.

20. An apparatus for displaying a task bar in a task management device, comprising:
- at least one cache in memory for storing information about font height of text displayed within the task bar, information about attributes of the task bar, the attributes including display shadowing characteristics and wrapping characteristics of a task bar displayed in a horizontal manner, information about how task bars are ordered relative to each other over a selected time period, the ordering including an awareness of only tasks associated with the selected time period and not all tasks, and the height and display position of the task bar;
- means for accessing the cache to store and obtain task information;
- means for using task information in the cache to render a task bar over the selected time period; and
- means for displaying the task bar on a display device from the cache in a time-dependent format.

21. A computer readable medium having stored therein instructions for causing a computer to perform the method of claim 1.

22. A computer readable medium having stored therein instructions for causing a computer to perform the method of claim 17.

* * * * *